United States Patent [19]
Lein

[11] 4,043,663
[45] Aug. 23, 1977

[54] DEVICE FOR APPLYING A FLEXIBLE HALFTONE SCREEN OVER A CAMERA VACUUM PLATEN

[75] Inventor: Juergen G. Lein, West Henrietta, N.Y.

[73] Assignee: Itek Corporation, Lexington, Mass.

[21] Appl. No.: 625,997

[22] Filed: Oct. 28, 1975

[51] Int. Cl.² .............................................. G03B 27/60
[52] U.S. Cl. ....................................... 355/73; 355/72; 355/76; 355/87; 355/125; 355/133
[58] Field of Search ...................... 355/71, 72, 73, 75, 355/76, 80, 87, 91, 94, 125, 133; 96/116, 117, 118

[56] References Cited

U.S. PATENT DOCUMENTS

| 2,155,149 | 4/1939 | Rutherford | 355/125 |
| 3,068,748 | 12/1962 | Schutt et al. | 355/73 |

Primary Examiner—Russell E. Adams
Attorney, Agent, or Firm—Homer O. Blair; Robert L. Nathans; Gerald H. Glanzman

[57] ABSTRACT

A roller is coupled to a movable support frame which in a first position bears a flexible halftone screen which is fully wound up about said roller. As the support frame is translated in a first direction across the film mounted upon a vacuum platen, the flexible screen unwinds and is laid flat across the platen. When the movable support frame is translated in a second direction, the screen is thereafter wound up about said roller somewhat in the manner of a "reverse windowshade."

10 Claims, 4 Drawing Figures

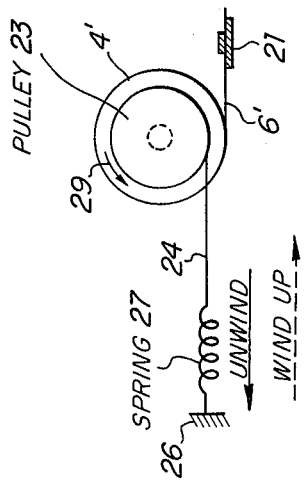
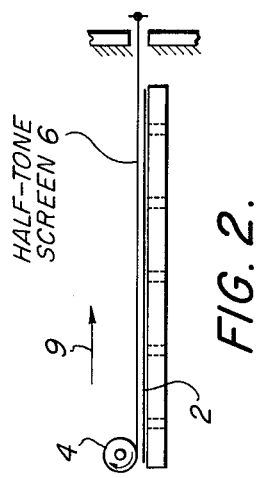
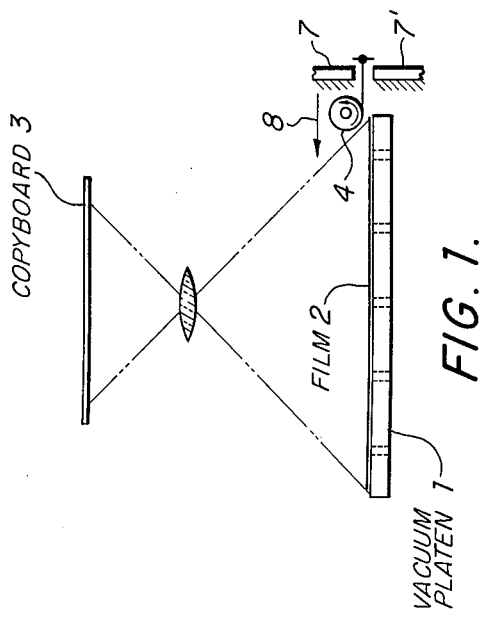
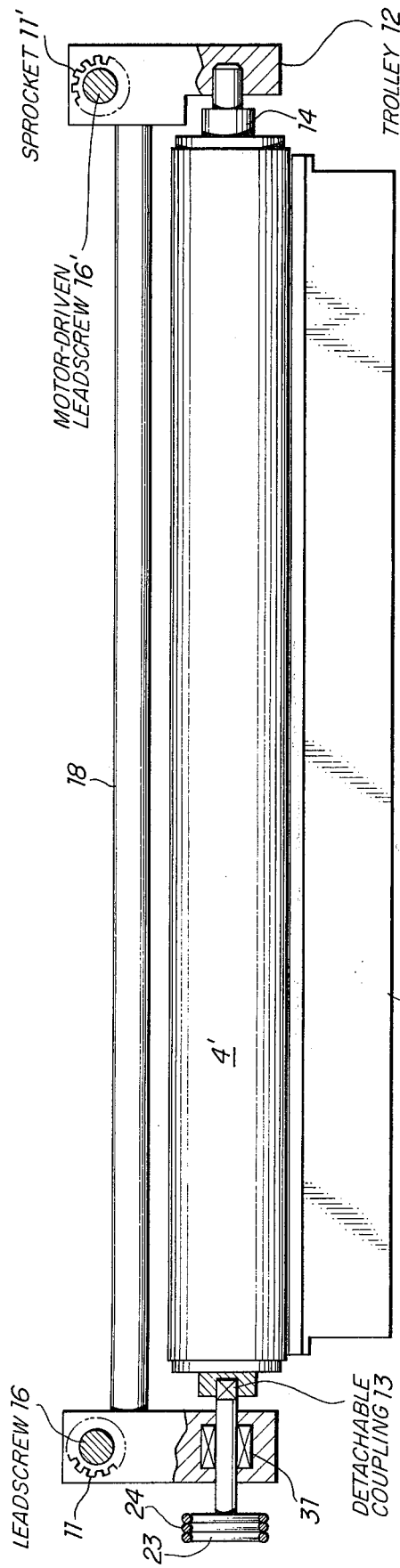

DEVICE FOR APPLYING A FLEXIBLE HALFTONE SCREEN OVER A CAMERA VACUUM PLATEN

BACKGROUND OF THE INVENTION

This invention relates to devices for applying halftone screens over a camera imaging platen.

Devices are known for causing a flexible halftone screen to be applied to the surface of a vacuum platen. See, for example, U.S. Patent to Schutt et al., U.S. Pat. No. 3,068,748. It is desirable to provide a device for applying the halftone screen which is somewhat simpler than the Schutt device, and is more compact so that the flexible screen is always stored on a single wound up roller and is laid flat upon being unwound without relative motion (rubbing) between the screen and the film positioned upon the screen. It is also desirable to rapidly replace flexible screens in the field.

SUMMARY OF THE INVENTION

In accordance with a preferred embodiment of the invention, a roller is rotatably supported upon a movable support frame which is translated back and forth over the surface of the platen. When the movable support frame assumes a first position, the flexible screen is fully wound up and stored about the roller. As the movable support frame is translated across the platen and the roller rotates in a first direction, the screen is unwound and laid flat upon the platen surface. On the other hand, the screen becomes wound up about the roller as the support frame is translated back across the platen. The roller is rotationally spring biased to maintain the screen tightly wound about the roller.

Other objects, features, and advantages of the present invention will become apparent upon the perusal of the detailed description taken in conjunction with the drawings in which:

FIGS. 1 and 2 schematically illustrate a basic principle of the invention;

FIG. 3 illustrates a side view of the roller together with the spring means for maintaining the screen in a tightly wound up condition about the roller; and FIG. 4 illustrates further details of a preferred embodiment of the invention.

DETAILED DESCRIPTION

FIG. 1 schematically illustrates one principle of the invention. A vacuum platen 1 is provided having a sheet of film 2 positioned thereupon which is exposed to a focused image of an object on copyboard 3. Roller 4 has the flexible halftone screen wound up thereabout and a terminal portion of screen 6 is mechanically coupled to the frame of the camera at frame portions 7 and 7'. As the roller is translated across the platen in the direction indicated by arrow 8, the screen is laid flat over the platen. At the end of the translation of roller 4, the screen 6 covers film 2 as shown in FIG. 2. As the roller 4 is translated back across the platen in the direction of arrow 9, the screen is thereafter wound up about the roller. Further details of one constructed embodiment are illustrated in FIGS. 3 and 4. Roller 4' is rotatably and detachably coupled to a first movable frame portion 11 and a second movable frame portion 12 by means of detachable coupling device 13 and 14. Lead screws 16 and 16' are provided to translate the movable roller support across the platen. The lead screw or screws may be driven by a motor, not shown in the interest of clarity. A cross bar 18 may be provided to couple the first and second frame portions together. FIG. 2 illustrates terminal screen portion 6' being coupled to mechanical ground at 21. The screen is wound up about the roller in FIG. 2. As the movable roller support is translated across the platen by virtue of the aforementioned lead screws, the screen is applied and removed from the film surface as described hereinabove. A pulley 23, shown in FIG. 2, having grooves therein is provided wherein a flexible wire 24 for example is coupled to the pulley and is positioned within the grooves. The wire extends in a direction parallel to the surface of the platen and is coupled to mechanical ground at 26 via spring 27. This structure rotationally biases the roller in a second direction opposite to the direction of rotation which occurs when the screen is being unwound in a first direction indicated by arrow 29. This arrangement serves to maintain the screen in a tightly wound up condition about the pulley regardless of its position with respect to the surface of the platen. The use of this structure is greatly preferred so that the screen is laid flat over the platen. The spring means, of course, may take numerous forms, but it is preferred that it be of a type which asserts a constant force with respect to the pulley, regardless of the position of the movable roller with respect to the platen. The pulley may be rotatably supported within the first movable frame portion 11 by bearing 31.

The use of a detachable screen roller is commercially significant since the flexible halftone screen may be rapidly replaced in the field. In contrast with the prior art, the screen is compactly stored about the roller. Furthermore, it is laid flat over the platen without rubbing, which is deemed undesirable.

While a preferred embodiment of the invention has been described in detail, the teachings of this invention will readily suggest many other embodiments to those skilled in the art.

What is claimed is:

1. The device for applying and removing a flexible halftone screen from a vacuum platen portion of a camera comprising:
   a. a roller having a first and second terminal portion;
   b. a movable support frame for supporting rotatably said roller and having a first portion coupled to the first terminal portion of said roller and having a second portion coupled to the second terminal portion of said roller;
   c. a flexible halftone screen wound about said roller a plurality of times when said roller is positioned at a first portion of said platen;
   d. means for coupling a terminal portion of said screen to a fixed frame portion of said camera;
   e. means for translating said movable support frame across said platen for causing said roller to rotate in a first direction to unwind said screen and cause it to be laid flat upon said platen; and
   f. means for rotatably biasing said roller in a second direction opposite said first direction for causing said screen to be tightly wound about said roller.

2. The device of claim 1, wherein said means for biasing said roller in a second direction includes a pulley coupled to said roller and having a counterspring means wound about said pulley.

3. The device of claim 2, wherein said counterspring asserts a constant force on said pulley.

4. The device of claim 2 further including means for manually coupling and decoupling said roller to and from said movable support frame.

5. The device of claim 3 further including means for manually coupling and decoupling said roller to and from said movable support frame.

6. The device of claim 4 further including a lead screw positioned within said movable support frame for translating said movable support frame across said vacuum platen.

7. The device of claim 5 further including a lead screw positioned within said movable support frame for translating said movable support frame across said vacuum platen.

8. A device for applying and removing a flexible halftone screen from a vacuum platen portion of a camera comprising:
   a. roller means having said flexible halftone screen wound a number of times thereabout when said roller means is positioned at a first portion of said platen;
   b. roller transport means for rotatably supporting said roller and for translating said roller means over said vacuum platen in contact therewith for causing said roller means to rotate in a first direction and lay said screen over said platen as said flexible screen unwinds from said roller means until said roller means reaches a second portion of said platen, and for translating said roller from said second portion of said platen back to said first portion while rewinding said flexible halftone screen about said roller in a second direction opposite said first direction;
   c. means for anchoring a terminal portion of said flexible halftone screen to the frame of said camera; and
   d. means for rotatably biasing said roller means in said second direction opposite said first direction including a pulley coupled to said roller means, said pulley having a counterspring means wrapped about said pulley.

9. A device for applying and removing a flexible halftone screen from a vacuum platen portion of a camera comprising:
   a. roller means having said flexible halftone screen wound a number of times thereabout when said roller means is positioned at a first portion of said platen;
   b. roller transport means for rotatably supporting said roller and for translating said roller means over said vacuum platen in contact therewith for causing said roller means to rotate in a first direction and lay said screen over said platen as said flexible screen unwinds from said roller means until said roller means reaches a second portion of said platen, and for translating said roller from said second portion of said platen back to said first portion while rewinding said flexible halftone screen about said roller in a second direction opposite said first direction;
   c. means for anchoring a terminal portion of said flexible halftone screen to the frame of said camera; and
   d. means including a constant force counterspring for rotatably biasing said roller means in said second direction opposite said first direction.

10. The device of claim 9, wherein said means for biasing said roller means in said second direction further includes a pulley coupled to said roller means, said pulley having said counterspring means wrapped about said pulley.

* * * * *